United States Patent
Han et al.

(10) Patent No.: US 7,773,953 B2
(45) Date of Patent: Aug. 10, 2010

(54) WIRELESS TRANSCEIVING APPARATUS FOR VARIABILITY OF SIGNAL PROCESSING BAND

(75) Inventors: Seon-Ho Han, Daejon (KR); Mun-Yang Park, Daejon (KR); Hyun-Kyu Yu, Daejon (KR); Cheon-Soo Kim, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 869 days.

(21) Appl. No.: 11/224,811

(22) Filed: Sep. 12, 2005

(65) Prior Publication Data
US 2006/0135086 A1 Jun. 22, 2006

(30) Foreign Application Priority Data
Dec. 17, 2004 (KR) .................. 10-2004-0108283

(51) Int. Cl.
H04B 1/40 (2006.01)
(52) U.S. Cl. .................. 455/76; 455/188.1; 455/552.1; 455/307; 455/84; 455/86; 455/112; 455/118; 455/82; 455/103; 330/295; 330/10; 331/177 V; 331/41; 331/179; 333/181; 375/295; 375/297; 375/219; 327/105; 257/723
(58) Field of Classification Search ............. 455/188.1, 455/552, 307, 76, 84, 86, 112, 118, 82, 103, 455/552.1; 375/295, 297, 219; 331/177 V, 331/41, 179; 330/295, 10; 333/181; 327/105; 257/723
See application file for complete search history.

(56) References Cited

U.S. PATENT DOCUMENTS
5,732,330 A * 3/1998 Anderson et al. ............. 455/76

(Continued)

FOREIGN PATENT DOCUMENTS
JP 2001-127709 A 5/2001

(Continued)

OTHER PUBLICATIONS
"A Direct Conversion RF Front-End for 2 GHz WCDMA and 5.8-GHz WLAN Applications," Hotti et al, 2003 IEEE Radio Frequency Integrated Circuits Symposium, MO2B-4, pp. 45-48, © 2003 IEEE.

(Continued)

*Primary Examiner*—Matthew D Anderson
*Assistant Examiner*—April G Gonzales
(74) *Attorney, Agent, or Firm*—Ladas & Parry LLP (57) ABSTRACT

Provided is a wireless transceiving apparatus for variability of signal processing band, in which at least one resonator of an analog processor and a VCO are simultaneously controlled using a frequency synthesizer, and a frequency of the VCO and a resonance frequency of the analog processor are controlled to have a rational number ratio, thereby capable of varying the signal processing band. The wireless transceiving apparatus includes: an analog processor having a plurality of resonators on a path of transmission/reception signals, for performing analog signal processing; a digital processor for performing digital signal processing on an output signal of the analog processor or data to be transmitted to the analog processor; and a frequency synthesizer for providing a local oscillation (LO) frequency and a controlling signal to the resonators of the analog processor so as to vary a signal processing band of the analog processor.

12 Claims, 5 Drawing Sheets

U.S. PATENT DOCUMENTS

| | | | |
|---|---|---|---|
| 5,973,568 A * | 10/1999 | Shapiro et al. | 330/295 |
| 6,005,446 A * | 12/1999 | Galani et al. | 331/41 |
| 6,215,988 B1 * | 4/2001 | Matero | 455/188.1 |
| 6,229,399 B1 * | 5/2001 | Tobise et al. | 331/17 |
| 6,584,304 B1 * | 6/2003 | Thomsen et al. | 455/188.1 |
| 6,833,769 B2 * | 12/2004 | Seppinen et al. | 331/177 V |
| 7,123,664 B2 * | 10/2006 | Matero | 375/295 |
| 7,236,542 B2 * | 6/2007 | Matero | 375/295 |
| 7,369,003 B2 * | 5/2008 | Hagelin | 331/116 M |
| 2001/0004227 A1 * | 6/2001 | Frech et al. | 333/181 |
| 2004/0183610 A1 * | 9/2004 | Seppinen et al. | 331/177 V |

FOREIGN PATENT DOCUMENTS

| | | |
|---|---|---|
| JP | 2003-078436 A | 3/2003 |
| KR | 1999-0046218 A | 7/1999 |
| KR | 10-20040022019 | 3/2004 |
| KR | 2004-0063496 A | 7/2004 |

OTHER PUBLICATIONS

"A Direct Conversion Transceiver for Multi-Band GSM Application," Strange et al, 2000 IEEE Radio Frequency Integrated Circuits Symposium, MON2A-3, pp. 25-28, © 2000 IEEE.

"A SiGe WCDMA/DCS Dual-band RF Front-end Receiver," Hsu et al, 2003 IEEE Radio Frequency Integrated Circuits Symposium, MO1B-5, pp. 27-30, © 2003 IEEE.

"A Single-Chip Multimode Receiver for GSM900, DCS1800, PCS1900, and WCDMA," Ryynanen et al, IEEE Journal of Solid-State Circuits, vol. 38, No. 4, Apr. 2003, pp. 594-602, © 2003 IEEE.

* cited by examiner

WIRELESS TRANSCEIVING APPARATUS FOR VARIABILITY OF SIGNAL PROCESSING BAND

FIELD OF THE INVENTION

The present invention relates to a wireless transceiving apparatus; and, more particularly, to a wireless transceiving apparatus for variability of signal processing band, in which at least one resonator of an analog processor and a VCO are simultaneously controlled using a frequency synthesizer, and a frequency of the VCO and a resonance frequency of the analog processor are controlled to have a rational number ratio, thereby capable of varying the signal processing band.

DESCRIPTION OF RELATED ART

Figure 1:
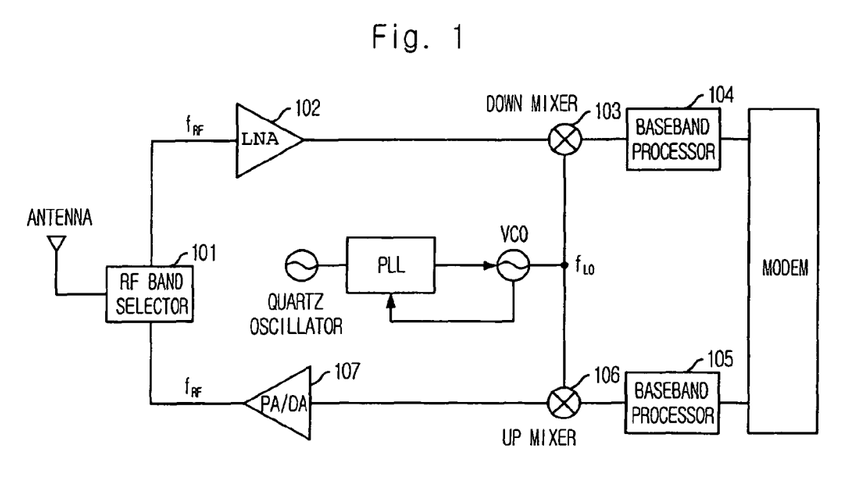
FIG. 1 is a block diagram of a conventional RF transceiving apparatus.

FIG. 1 is a block diagram of a conventional RF transceiving apparatus.

In a conventional RF front-end for wireless communication, in view of a receiver, an RF band selector 101 selects signal band from a small signal transmitted over a high frequency of a specific band and received through an antenna. A low noise amplifier (LNA) 102 amplifies the signal so as to make signal-to-noise ratio maximally large. A down mixer 103 down-converts signal band to a lower frequency band (DC or IF frequency). A baseband processor 104 amplifies and low-pass-filters signals such that the signals can be processed by a processor.

Meanwhile, in view of a transmitter, a baseband processor 105 and an up mixer 106 multiply the signals from the processor by a carrier frequency to thereby shift it to a high frequency band. A power amplifier 107 amplifies power of the signals and then the signals are transmitted through the antenna.

Figure 2:
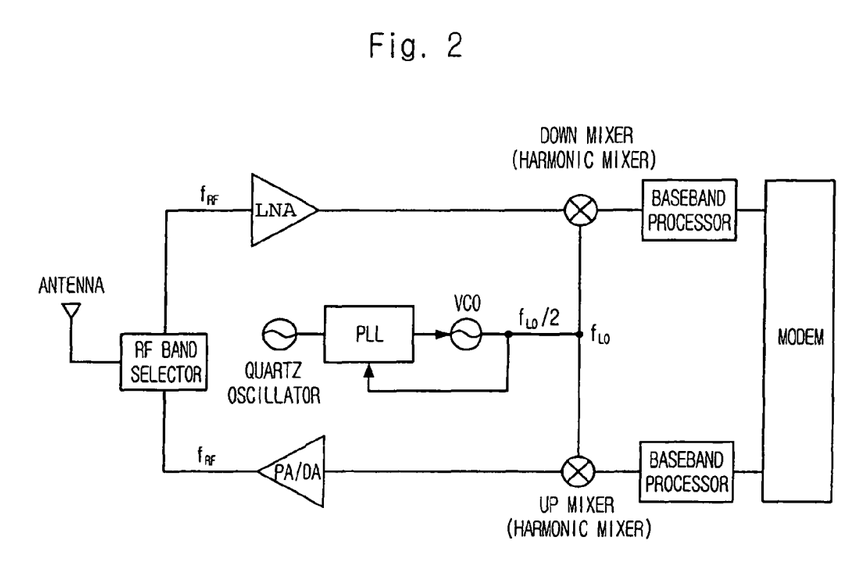
FIG. 2 is a block diagram of a conventional RF transceiving apparatus using an $f_{RF} \times f_{LO}/2$ harmonic mixer.

FIG. 2 is a block diagram of a conventional RF transceiving apparatus using an $f_{RF} \times f_{LO}/2$ harmonic mixer. A direct conversion structure that directly converts an RF to a DC is shown in FIG. 2. A harmonic mixer can reduce a DC offset problem of the direct conversion.

Figure 3:
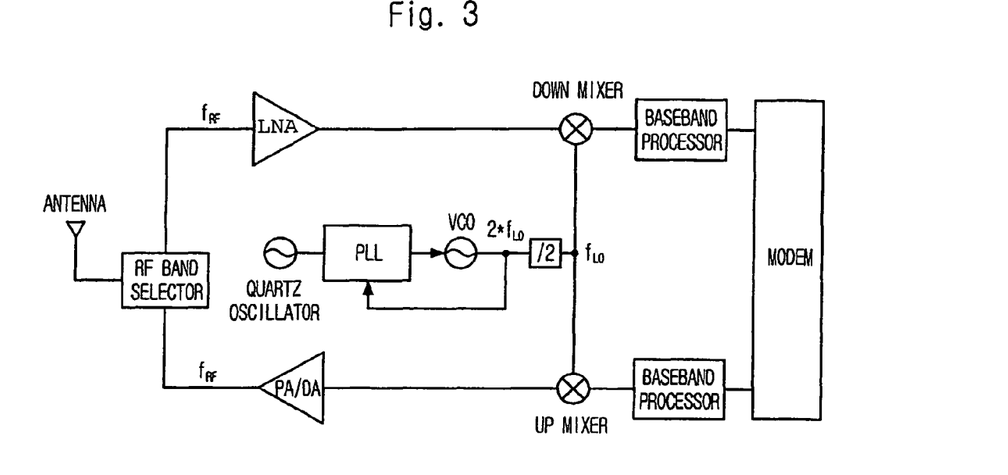
FIG. 3 is a block diagram of a conventional RF transceiving apparatus using a $f_{RF} \times f_{LO}$ mixer and $f_{VCO}=2 \times f_{LO}$.

FIG. 3 is a block diagram of a conventional RF transceiving apparatus using an $f_{RF} \times F_{LO}$ mixer and $f_{VCO}=2 \times f_{LO}$. A direct conversion structure that directly converts an RF to a DC is shown in FIG. 3.

The transceiving apparatuses shown in FIGS. 1 to 3 have problems in that they can process only signals of a specific frequency band. The reason is that impedance must be matched at a specific signal band in order to transmit/receive signal power of a high frequency to the maximum and the transceiving apparatus is designed to amplify only specific frequency band.

SUMMARY OF THE INVENTION

It is, therefore, an object of the present invention to provide a wireless transceiving apparatus for variability of signal processing band, in which at least one resonator of an analog processor and a VCO are simultaneously controlled using a frequency synthesizer, and a frequency of the VCO and a resonance frequency of the analog processor are controlled to have a rational number ratio, thereby capable of varying the signal processing band.

In accordance with an aspect of the present invention, there is provided a wireless transceiving apparatus for variability of signal processing band, including: an analog processor having a plurality of resonators on a path of transmission/reception signals, for performing analog signal processing; a digital processor for performing digital signal processing on an output signal of the analog processor or data to be transmitted to the analog processor; and a frequency synthesizer for providing a local oscillation (LO) frequency and a controlling signal to the resonators of the analog processor so as to vary a signal processing band of the analog processor.

A resonance frequency of at least one resonator of the resonators contained in the low noise amplifier, the up mixer, the down mixer and the PA/DA is controlled by the frequency synthesizer. A ratio of the resonance frequency of the VCO to the resonance frequency of the resonators used in the RF front-end block has a predetermined proportional number (N), where N is a rational number.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 4:
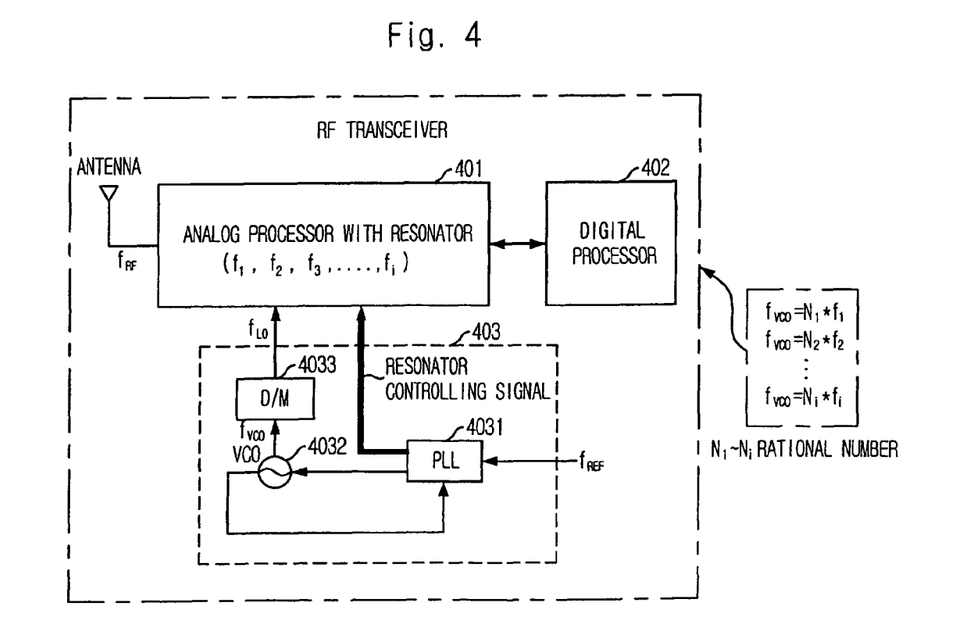
FIG. 4 is a block diagram of a wireless transceiving apparatus for variability of signal processing band in accordance with an embodiment of the present invention.

FIG. 4 is a block diagram of a wireless transceiving apparatus for variability of signal processing band in accordance with an embodiment of the present invention. The RF transceiving apparatus can vary a matching frequency by controlling a frequency synthesizer. The RF transceiving apparatus can be divided into three blocks.

A first block is a signal path block 401 (that is, an analog processor with a resonator) that amplifies a signal received through an antenna or selects desired frequency band from the signal. A front-end of the signal path block 401 uses a resonator for processing RF signals.

A second block is a digital processor 402 that digitally processes the signal transmitted from the signal path block 401. That is, the digital processor 402 performs digital signal processing on the output signal of the analog processor 401 or data to be transmitted to the analog processor 401.

A third block is a frequency synthesizer 403 that provides a local oscillation (LO) frequency signal ($f_{LO}$) and a control signal to the resonator of the analog processor 401 in order to vary the signal processing band of the analog processor.

The frequency synthesizer 403 includes a phase locked loop (PLL) 4031, a voltage controlled oscillator (VCO) 4032, and a divider or multiplier (D/M) 4033. The PLL 4031 feeds back an output signal of the VCO until the output signal reaches a predetermined frequency, and provides a control signal to the resonator of the analog processor 401. The VCO 4032 generates a predetermined frequency signal according to the output signal of the PLL 4031. The D/M 4033 adjusts the frequency of the output signal of the VCO.

In the RF front-end, the PLL frequency synthesizer 403 is a block that generates necessary LO frequency. Accordingly, the PLL frequency synthesizer 403 generates a voltage or digital signal controlling the output frequency of the VCO 4032 and provides an exact LO frequency to the system through a negative feedback loop.

In this embodiment, the control signal controlling the resonance frequency of the VCO 4032 existing in the negative feedback loop is supplied to the RF transceiving apparatus (specifically, the signal processor 401 with the resonator). Therefore, when the resonance frequency of the VCO 4032 is shifted, the signal processing band of the transceiving apparatus can be varied.

Here, at least one block 401 of the RF transceiving apparatus receives the control signal from the frequency synthesizer 403. Although the resonator of the analog block 401 does not exist in the negative feedback loop, it can receive the control signal from the VCO 4032 of the frequency synthesizer 403 and shift the resonance frequency.

The resonance frequency $f_{VCO}$ of the VCO 4032 and the resonance frequencies $f_1, f_2, f_3, \ldots, f_i$ of the resonators of the analog processor 401 have proportional constants $N_1, N_2, \ldots, N_i$. That is, the resonators of the analog processor 401 have resonance frequencies proportional to the resonance frequency of the VCO 4032. The proportional constants $N_1, N_2, \ldots, N_i$ are rational numbers. All proportional constants may be equal to or different from one another and may be divided into several groups.

The D/M 4033 is a frequency divider/multiplier that can pass the frequency of the VCO 4032, or can divide the frequency of the VCO 4032 and then pass the divided frequencies, or can multiply the frequency of the VCO 4032.

FIGS. 5 to 9 are detailed block diagrams of the wireless transceiving apparatus for variability of signal processing band in accordance with an embodiment of the present invention.

Figure 5:
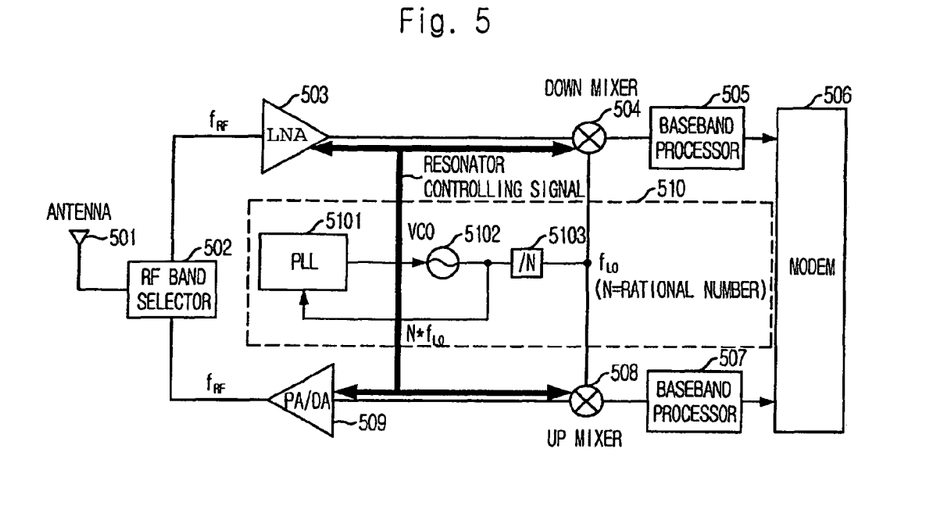
FIGS. 5 to 9 are detailed block diagrams of a wireless transceiving apparatus for variability of signal processing band in accordance with an embodiment of the present invention.

FIG. 5 is a block diagram of a direct conversion RF transceiving apparatus using an $f_{RF} \times f_{LO}$ mixer and $f_{VCO} = N \times f_{LO}$, in which a resonance frequency is controlled by a frequency synthesizer.

In such a transceiving apparatus, the frequency of the VCO is divided by a rational number N and then an LO signal is supplied to mixers 504 and 508.

An antenna 501 receives RF signals, and an RF band selector 502 is a selector that transmits desired signals among the received RF signals to the system. Also, the RF band selector 502 outputs the output signal of the system.

A low noise amplifier (LNA) 503 amplifies an input signal with lowest noise and high signal gain. Also, the low noise amplifier 503 receives a resonator controlling signal for varying frequency band of the resonator used in the frequency synthesizer.

A down mixer 504 receives the output signal of the low noise amplifier 503 and the LO signal of the frequency synthesizer and operates as a frequency mixer. That is, the down mixer 504 down-converts the output signal of the low noise amplifier 503 to a low frequency band at which the output signal can be processed in the baseband processor 505.

As shown in FIG. 5, the down mixer 504 also receives the resonator controlling signal from the frequency synthesizer when the resonator is used in the mixer.

The baseband processor 505 of the receiver side performs amplification/band-selection/analog-to-digital conversion on the down-converted signal and provides its output signal to a modem 506.

Meanwhile, a baseband processor 507 of a transmitter side performs digital-to-analog conversion/amplification/band-selection on digital signal received from the modem 506 and transmits its output signal to an up mixer 508.

The up mixer 508 receives the output signal of the baseband processor 507 and the LO signal of the frequency synthesizer and operates as a frequency mixer. That is, the up mixer 508 up-converts the output signal of the baseband processor 507 to a high frequency band.

The up mixer 508 can also receive the controlling signal from the frequency synthesizer. A power amplifier/drive amplifier (PA/DA) 509 is a block that amplifies the high-frequency signal outputted from the up mixer 508 and transmits a high-power signal.

The frequency synthesizer 510 includes a PLL 5101, a VCO 5102, and a frequency divider/multiplier 5103. As described above in FIG. 4, the PLL 5101 provides its output signal to the low noise amplifier 503, the up/down mixers 504 and 508, and the PA/DA 509, as well as the VCO 5102.

Figure 6:
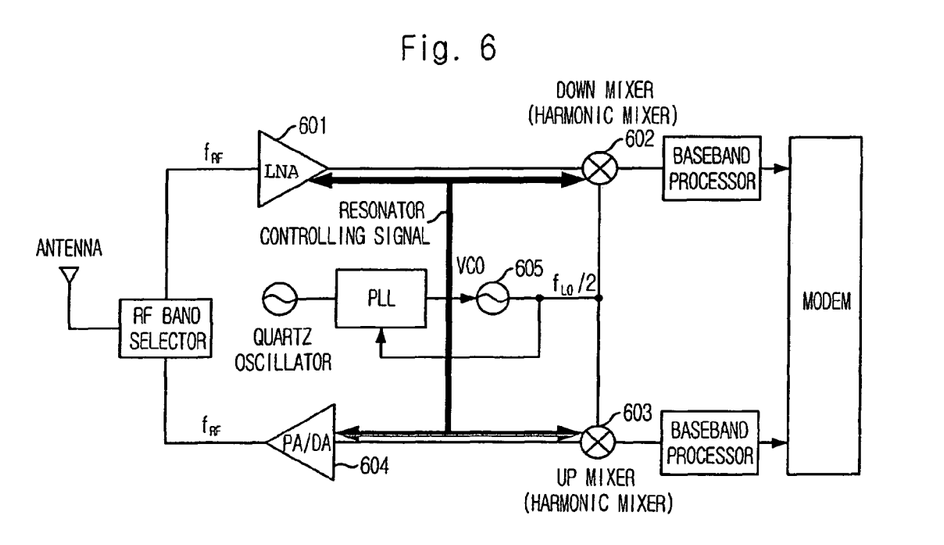

FIG. 6 is a block diagram of a direct conversion RF transceiving apparatus using an $f_{RF} \times f_{LO}/2$ harmonic mixer, in which a resonance frequency is controlled by a frequency synthesizer.

Referring to FIG. 6, the RF transceiving apparatus controls a frequency of at least one resonator of the resonators contained in the low noise amplifier 601, the up mixer 603, the down mixer 602 and the PA/DA 604, and uses $f_{RF} \times f_{LO}/2$ harmonic mixers 602 and 603. In FIG. 6, there is provided no frequency divider/multiplier for simply passing the output signal of the VCO 605.

Figure 7:
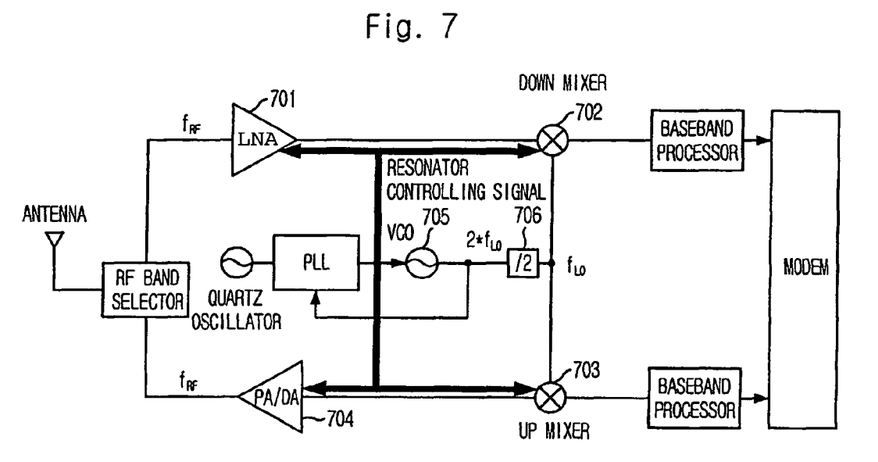

FIG. 7 is a block diagram of a direct conversion RF transceiving apparatus using an $f_{RF} \times f_{LO}$ mixer and $f_{VCO} = 2 \times f_{LO}$, in which a resonance frequency is controlled by a frequency synthesizer.

Referring to FIG. 7, the RF transceiving apparatus controls a frequency of at least one resonator of the resonators contained in the low noise amplifier 701, the up mixer 703, the down mixer 702 and the PA/DA 704, and uses $f_{RF} \times f_{LO}$ mixers and $f_{VCO} = 2 \times f_{LO}$. In FIG. 7, there is provided a frequency divider 706 for dividing the frequency of the output signal of the VCO 705.

Figure 8:
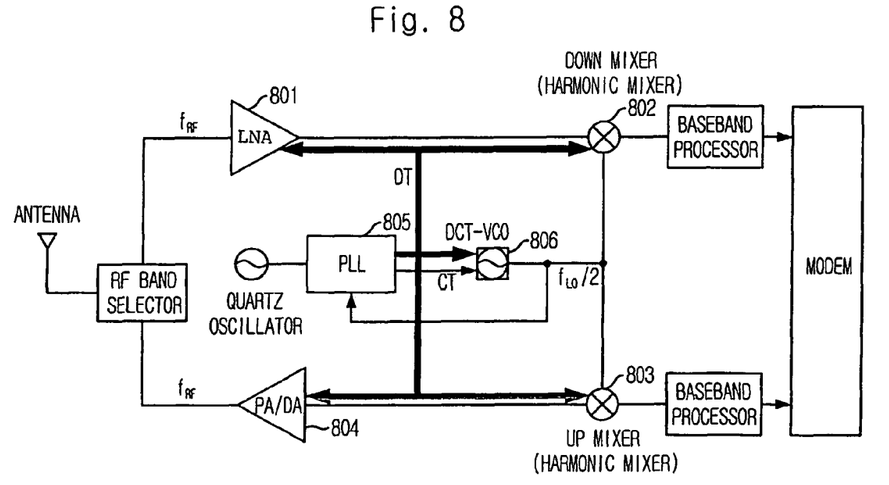

FIG. 8 is a block diagram of a direct conversion RF transceiving apparatus that controls a resonance frequency using a frequency synthesizer and uses an $f_{RF} \times f_{LO}/2$ harmonic mixer, thereby improving signal linearity.

Frequency variations of the resonators used in the signal processing blocks (analog processor) 801, 802, 803 and 804 are discrete. For this purpose, the synthesizers 805 and 806 provide discrete tuning (DT) signals to the resonators. A reference symbol CT represents a continuous tuning signal. The CT signal is an analog signal for allowing the PLL 805 to finely tune the frequency of the VCO 806. Here, the VCO 806 is a discretely and continuously tunable voltage controlled oscillator (DCT-VCO) that can also receive discrete tuning (DT) signals.

Referring to FIG. 8, the RF transceiving apparatus controls a resonance frequency of at least one resonator of the resonators contained in the low noise amplifier 801, the up mixer 803, the down mixer 802 and the PA/DA 804, and uses $f_{RF} \times f_{LO}/2$ harmonic mixers. In order to improve the signal linearity, the resonators are varied discretely and their controls are provided to the frequency synthesizer.

Figure 9:
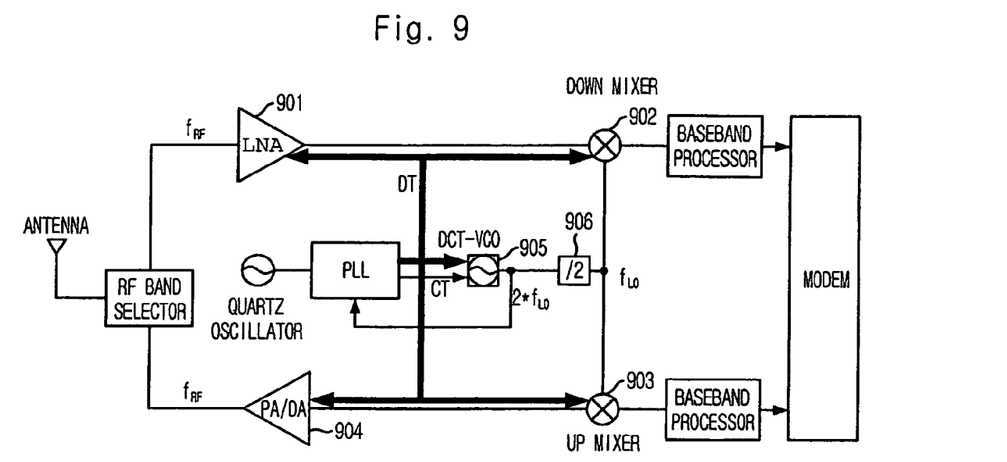

FIG. 9 is a block diagram of a direct conversion RF transceiving apparatus that controls a resonance frequency using a frequency synthesizer and uses an $f_{RF} \times f_{LO}$ mixer and $f_{VCO} = 2 \times f_{LO}$, thereby improving signal linearity.

Referring to FIG. 9, the RF transceiving apparatus controls a resonance frequency of at least one resonator of the resonators contained in the low noise amplifier 901, the up mixer 903, the down mixer 902 and the PA/DA 904, and uses $f_{RF} \times f_{LO}$ mixers and $f_{VCO}=2 \times f_{LO}$. In order to improve the signal linearity, the resonators are varied discretely and their controls are provided to the frequency synthesizer.

Meanwhile, unlike the RF transceiving apparatus of FIG. 8, the frequency divider 906 is provided to divide the frequency of the output signal of the VCO 905.

As described above, the resonators used in the blocks that control RF signals in the wireless communication system are simultaneously controlled together with the VCO by using the frequency synthesizer of the system, thereby varying the signal processing bands.

Also, since the frequency of the VCO and the resonance frequency of the signal processing blocks have the rational number ratio, the present invention can be applied to all systems, such as a heterodyne structure, a low-IF structure, and a DCR structure. Further, the high-performance wireless communication systems can be realized by varying the signal processing bands over the wideband.

The present application contains subject matter related to Korean patent application No. 2004-0108283, filed with the Korean Intellectual Property Office on Dec. 17, 2004, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A wireless transceiving apparatus for variability of signal processing band, comprising:

an analog processor having a plurality of components on a path of transmission/reception signals, for performing analog signal processing, the components include at least one resonator;

a digital processor for performing digital signal processing on an output signal of the analog processor or data to be transmitted to the analog processor; and a frequency synthesizer for providing anyone of a plurality of local oscillation (LO) frequencies among a signal processing band for tuning the analog processor at the provided LO frequency and for providing a resonator controlling signal to at least one resonator of the analog processor so as to vary tuning along the signal processing band of the analog processor when a different LO frequency is provided from the frequency synthesizer to the analog processor wherein the frequency synthesizer controls a frequency of a voltage controlled oscillator (VCO) and a resonance frequency of the signal processors to have a rational number ratio relative to the provided LO frequency, wherein the frequency synthesizer provides the resonator controlling signal to the VCO and to the analog processor, wherein the frequency synthesizer includes:

a phase locked loop (PLL) for feeding back an output signal of the VCO until the output signal reaches a predetermined frequency and for providing the resonator controlling signal to at least one resonator of the analog processor;

the VCO for generating the predetermined frequency signal in response to the output signal of the PLL; and a frequency adjuster for adjusting the frequency of the output signal of the VCO into anyone of the LO frequencies and for providing the provided LO frequency to the analog processor.

2. The wireless transceiving apparatus as recited in claim 1, wherein the components are a low noise amplifier (LNA), up/down mixers, a drive amplifier (DA), and a power amplifier (PA).

3. The wireless transceiving apparatus as recited in claim 2, wherein the resonator controlling signal from the frequency synthesizer is inputted to at least one resonator of the analog processor.

4. The wireless transceiving apparatus as recited in claim 1, wherein the PLL provides the resonator controlling signal from the VCO to at least one resonator of the analog processor.

5. The wireless transceiving apparatus as recited in claim 1, wherein the frequency adjuster is a frequency divider/multiplier that passes the output signal of the VCO, or divides or multiplies the frequency of the VCO by a predetermined number.

6. The wireless transceiving apparatus as recited in claim 1, wherein the VCO is a discretely and continuously tunable voltage controlled oscillator (DCT-VCO), the PLL provides the resonator controlling signal as a discrete tuning (DT) resonator controlling signal to at least one resonator of the analog processor so as to discretely vary tuning of the frequency of at least one resonator, and the PLL also provides the DT resonator controlling signal and a continuous tuning (CT) signal to the discretely and continuously tunable voltage controlled oscillator (DCT-VCO).

7. A wireless transceiving apparatus for variability of signal processing band, comprising:

an analog processor having a plurality of components on a path of transmission/reception signals, configured to perform analog signal processing, the components include at least one resonator;

a digital processor configured to perform digital signal processing on an output signal of the analog processor or data to be transmitted to the analog processor; and a frequency synthesizer configured to provide anyone of a plurality of local oscillation (LO) frequencies among a signal processing band for tuning the analog processor at the provided LO frequency and configured to provide a resonator controlling signal to at least one resonator of the analog processor so as to vary tuning along the signal processing band of the analog processor when a different LO frequency is provided from the frequency synthesizer to the analog processor, wherein the frequency synthesizer is configured to control a frequency of a voltage controlled oscillator (VCO) and a resonance frequency of the signal processors to have a rational number ratio relative to the provided LO frequency by providing the resonator controlling signal to the VCO and to the analog processor, the frequency synthesizer including:

a phase locked loop (PLL) configured to feed back an output signal of the VCO until the output signal reaches a predetermined frequency and configured to provide the resonator controlling signal to at least one resonator of the analog processor;

the VCO configured to generate the predetermined frequency signal in response to the output signal of the PLL; and a frequency adjuster configured to adjust the frequency of the output signal of the VCO into anyone of the LO frequencies and configured to provide the provided LO frequency to the analog processor.

8. The wireless transceiving apparatus as recited in claim 7, wherein the components are a low noise amplifier (LNA), up/down mixers, a drive amplifier (DA), and a power amplifier (PA).

9. The wireless transceiving apparatus as recited in claim 7, wherein the resonator controlling signal from the frequency synthesizer is inputted to at least one resonator of the analog processor.

10. The wireless transceiving apparatus as recited in claim 7, wherein the PLL provides the resonator controlling signal from the VCO to at least one resonator of the analog processor.

11. The wireless transceiving apparatus as recited in claim 7, wherein the frequency adjuster is a frequency divider/multiplier that passes the output signal of the VCO, or divides or multiplies the frequency of the VCO by a predetermined number.

12. The wireless transceiving apparatus as recited in claim 7, wherein the VCO is a discretely and continuously tunable voltage controlled oscillator (DCT-VCO), the PLL provides the resonator controlling signal as a discrete tuning (DT) resonator controlling signal to at least one resonator of the analog processor so as to discretely vary tuning of the frequency of at least one resonator, and the PLL also provides the DT resonator controlling signal and a continuous tuning (CT) signal to the discretely and continuously tunable voltage controlled oscillator (DCT-VCO).

\* \* \* \* \*